United States Patent
Jeon (10) Patent No.: US 11,235,800 B2
(45) Date of Patent: Feb. 1, 2022

(54) VEHICLE TERMINAL AND METHOD FOR CONTROLLING STEERING THEREBY

(71) Applicants: Hyundai Motor Company, Seoul (KR); Kia Motors Corporation, Seoul (KR)

(72) Inventor: Young Tak Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 16/560,551

(22) Filed: Sep. 4, 2019

(65) Prior Publication Data

US 2020/0391795 A1 Dec. 17, 2020

(30) Foreign Application Priority Data

Jun. 12, 2019 (KR) ........................ 10-2019-0069298

(51) Int. Cl.
| | |
|---|---|
| *B62D 6/00* | (2006.01) |
| *B62D 1/02* | (2006.01) |
| *B62D 15/02* | (2006.01) |
| *G05D 1/02* | (2020.01) |
| *B62D 5/04* | (2006.01) |

(52) U.S. Cl.
CPC .............. *B62D 6/00* (2013.01); *B62D 1/02* (2013.01); *B62D 5/0457* (2013.01); *B62D 15/021* (2013.01); *G05D 1/0212* (2013.01); *G05D 2201/0213* (2013.01)

(58) Field of Classification Search
CPC .......... B62D 6/00; B62D 1/02; B62D 15/021; B62D 5/0457; B62D 15/025; B62D 6/002; G05D 1/0212; G05D 2201/0213
See application file for complete search history.

(56) References Cited

U.S. PATENT DOCUMENTS

| | | | | |
|---|---|---|---|---|
| 8,610,595 | B1* | 12/2013 | Aleteeby | G08G 1/096741 340/901 |
| 2010/0209881 | A1* | 8/2010 | Lin | G09B 19/167 434/65 |
| 2015/0346723 | A1* | 12/2015 | Pedersen | B60W 30/10 701/25 |
| 2017/0336218 | A1* | 11/2017 | Beaurepaire | G08G 1/167 |
| 2018/0058865 | A1* | 3/2018 | Takeuchi | G01C 21/34 |
| 2018/0370532 | A1* | 12/2018 | Schein | B60W 40/06 |
| 2019/0009778 | A1* | 1/2019 | Schein | B60W 30/095 |
| 2019/0051061 | A1* | 2/2019 | Battles | G05D 1/0088 |
| 2019/0161086 | A1* | 5/2019 | Bettger | B60W 50/14 |
| 2019/0193786 | A1* | 6/2019 | Abusabbah | B62D 15/025 |
| 2020/0255060 | A1* | 8/2020 | Mueller | B60W 50/0205 |
| 2020/0346691 | A1* | 11/2020 | Zhu | G05D 1/0223 |

* cited by examiner

*Primary Examiner* — Sze-Hon Kong
(74) *Attorney, Agent, or Firm* — Mintz Levin Cohn Ferris Glovsky and Popeo, P.C.; Peter F. Corless (57) ABSTRACT

A vehicle terminal and a method for controlling steering thereby are provided. The vehicle terminal includes a steering controller that adjusts a wheel steering, and a processor that determines a steered wheel angle when a vehicle is stopped at a direction switching point, based on road information based on a current position of the vehicle. The processor instructs the steering controller to adjust the wheel steering in advance based on the determined steered wheel angle.

22 Claims, 9 Drawing Sheets

VEHICLE TERMINAL AND METHOD FOR CONTROLLING STEERING THEREBY

CROSS-REFERENCE TO RELATED APPLICATION

This application claims the benefit of priority to Korean Patent Application No. 10-2019-0069298, filed on Jun. 12, 2019, the entire contents of which are incorporated herein by reference.

TECHNICAL FIELD

The present disclosure relates to a vehicle terminal and a method for controlling steering thereby, and more particularly, to a vehicle terminal that adjusts a steered wheel angle in advance based on a surrounding environment of a vehicle while the vehicle is stopped for switching direction.

BACKGROUND

An autonomous vehicle refers to a vehicle that is capable of driving without intervention or manipulation of a driver, by recognizing a vehicle's driving environment to determine risks and plan a driving route. The autonomous vehicle aligns a vehicle wheel to be directed at a front of the vehicle (e.g., at 12 o'clock position) when the vehicle is stopped for switching a direction, for example, making a U-turn, left turn, right turn, or the like. The autonomous vehicle adjusts a steered wheel angle of the wheel based on a surrounding environment when departing (driving) again after stopping. Accordingly, when the vehicle starts to travel and adjusts the steered wheel angle, a turning radius (rotation radius) of the vehicle increases, which slows down a traveling speed of the vehicle. Further, when it is difficult for the vehicle to turn due to an obstacle and/or a narrow lane width, or the like, the vehicle may need to move backward to secure an area for the turning and then proceed again.

SUMMARY

The present disclosure provides a vehicle terminal that adjusts a steered wheel angle in advance based on a surrounding environment of a vehicle while the vehicle is stopped for switching direction and a method for controlling steering thereby.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle terminal may include a steering controller configured to adjust a wheel steering and a processor configured to determine a steered wheel angle when a vehicle is stopped at a direction switching point, based on road information based on a current position of the vehicle; and instruct the steering controller to adjust the wheel steering in advance based on the determined steered wheel angle.

The road information may include at least one of a roadway width, a lane width, and the number of lanes. The vehicle terminal may further include storage configured to store wheel trajectory information. The processor may be configured to determine whether the vehicle is able to switch direction at one time based on the wheel trajectory information and the roadway width. The wheel trajectory information may include at least one of a turning trajectory function for each vehicle and a turning trajectory range for each vehicle. The turning trajectory range for each vehicle may include maximum turning radius and minimum turning radius for each steering wheel angle and for each vehicle speed.

The processor may be configured to calculate the optimum steered wheel angle for performing the direction switching at one time based on the roadway width when the vehicle is able to switch the direction at one time. The processor may additionally be configured to calculate the optimum steered wheel angle based on a predetermined driving route. The processor may be configured to collect surrounding environment information using sensors mounted on the vehicle and calculate the optimum steered wheel angle based on the collected surrounding environment information. The surrounding environment information may include at least one of a surrounding image of the vehicle and a distance between the vehicle and a surrounding object.

Further, the processor may be configured to calculate a vehicle speed together when calculating the optimum steered wheel angle. The processor may be configured to determine the steered wheel angle to be a maximum steered wheel angle when the vehicle is not able to switch the direction at one time. The processor may then be configured to change the steered wheel angle using a V2V (Vehicle to Vehicle) communication when a forward driving route of another vehicle overlaps with a turning route of the vehicle.

According to another aspect of the present disclosure, a method for controlling steering by a vehicle terminal may include determining whether a vehicle is stopped at a direction switching point, determining a steered wheel angle when the vehicle is stopped at the direction switching point, based on road information based on a current position of the vehicle, and adjusting the wheel steering in advance based on the determined steered wheel angle.

The road information may include at least one of a roadway width, a lane width, and the number of lanes. The method may further include determining whether the vehicle is able to switch direction at one time based on wheel trajectory information and the road information after the determining of whether the vehicle is stopped at the direction switching point. The wheel trajectory information may include at least one of a turning trajectory function for each vehicle and a turning trajectory range for each vehicle. The turning trajectory range for each vehicle may include maximum turning radius and minimum turning radius for each steering wheel angle and for each vehicle speed.

The determining of the steered wheel angle may include calculating the optimum steered wheel angle for performing the direction switching at one time based on the roadway width when the vehicle is able to switch the direction at one time. In addition, the determining of the steered wheel angle may include calculating an optimum steered wheel angle based on a predetermined driving route. The determining of the steered wheel angle may also include collecting surrounding environment information using sensors mounted on the vehicle and calculating the optimum steered wheel angle based on the collected surrounding environment information.

Additionally, the determining of the steered wheel angle may include calculating a vehicle speed together when calculating the optimum steered wheel angle. The determining of the steered wheel angle may include determining the steered wheel angle to be a maximum steered wheel angle when the vehicle is not able to switch the direction at one time. The method may further include changing the steered wheel angle using a V2V (Vehicle to Vehicle) communication when a forward driving route of another vehicle overlaps with a turning route of the vehicle after the determining of the steered wheel angle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technology that, while an autonomous vehicle is stopped for switching a direction, switches a direction of a wheel of the vehicle in advance based on a surrounding environment, to perform the direction switching more easily and rapidly. In the present specification, a steering wheel angle refers to a rotation angle of a steering wheel, a steered wheel angle refers to a rotation angle of a steered wheel (e.g. a front wheel or the like), and a turning speed refers to a traveling speed of a vehicle (a vehicle speed) for turning or switching a direction.

Figure 1:
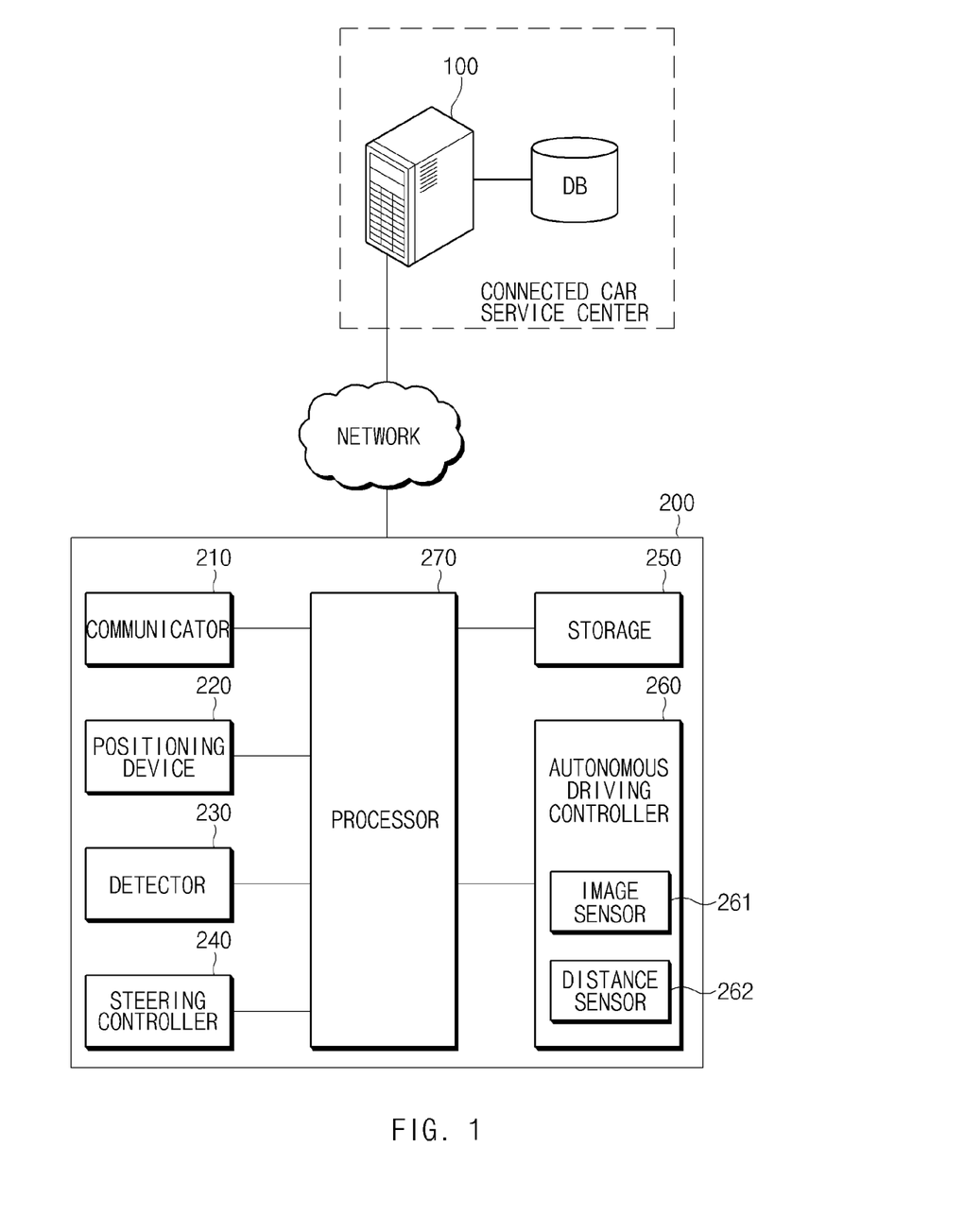
FIG. 1 is a block diagram of an autonomous driving support system according to an exemplary embodiment of the present disclosure.
Figure 2:
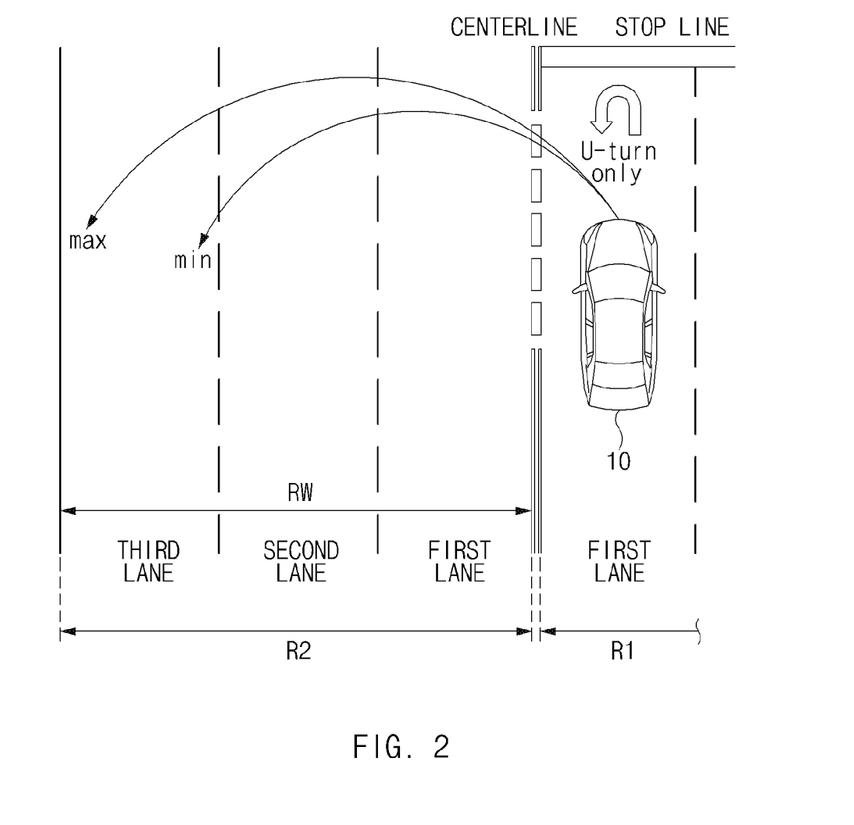
FIG. 2 is a diagram for illustrating a method for determining whether a direction may be switched at one time according to an exemplary embodiment of the present disclosure.
Figure 3:
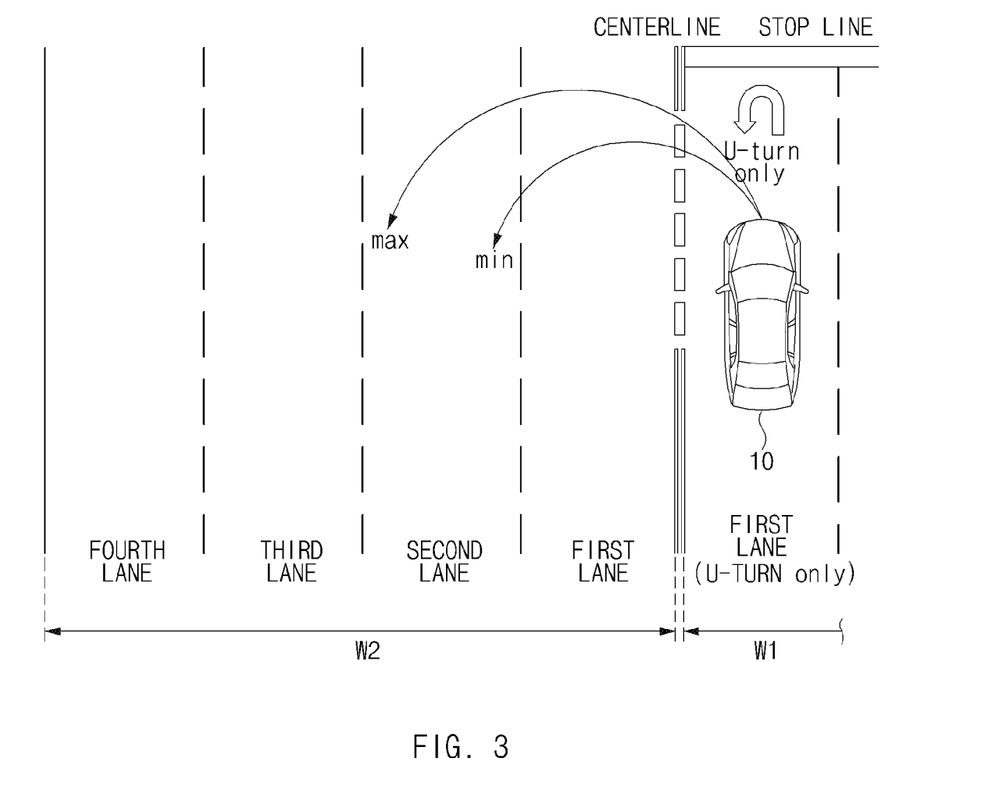
FIGS. 3 to 5 illustrate an example of determining a steered wheel angle and a vehicle speed according to an exemplary embodiment of the present disclosure.
Figure 4:
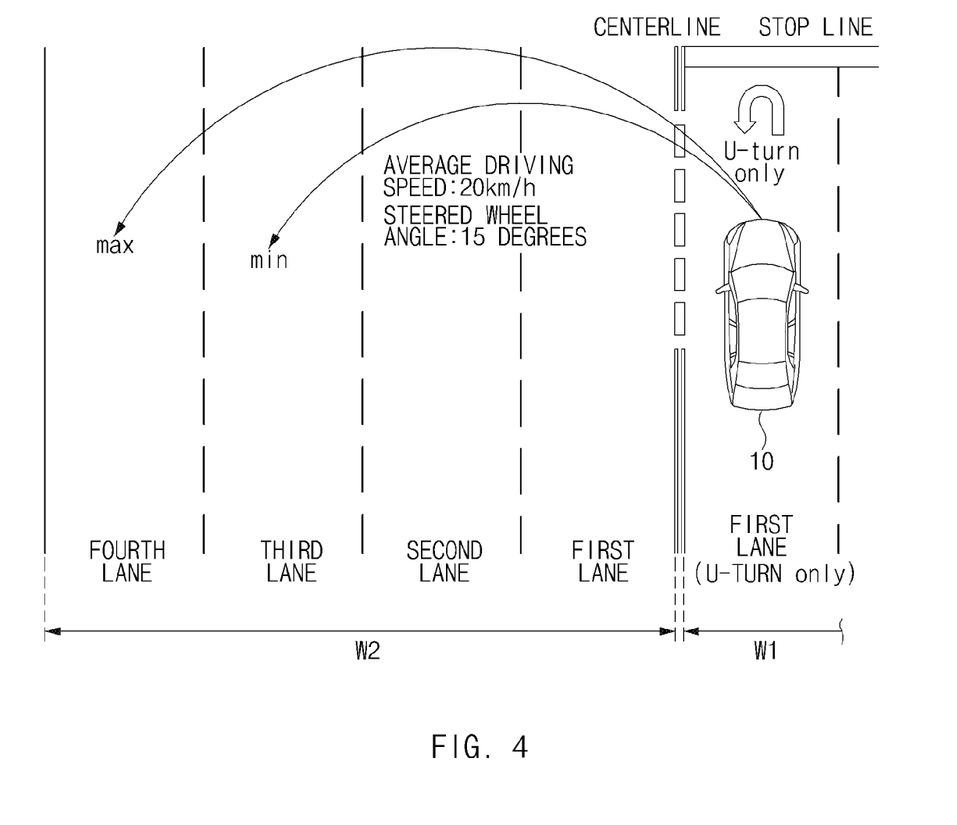
Figure 5:
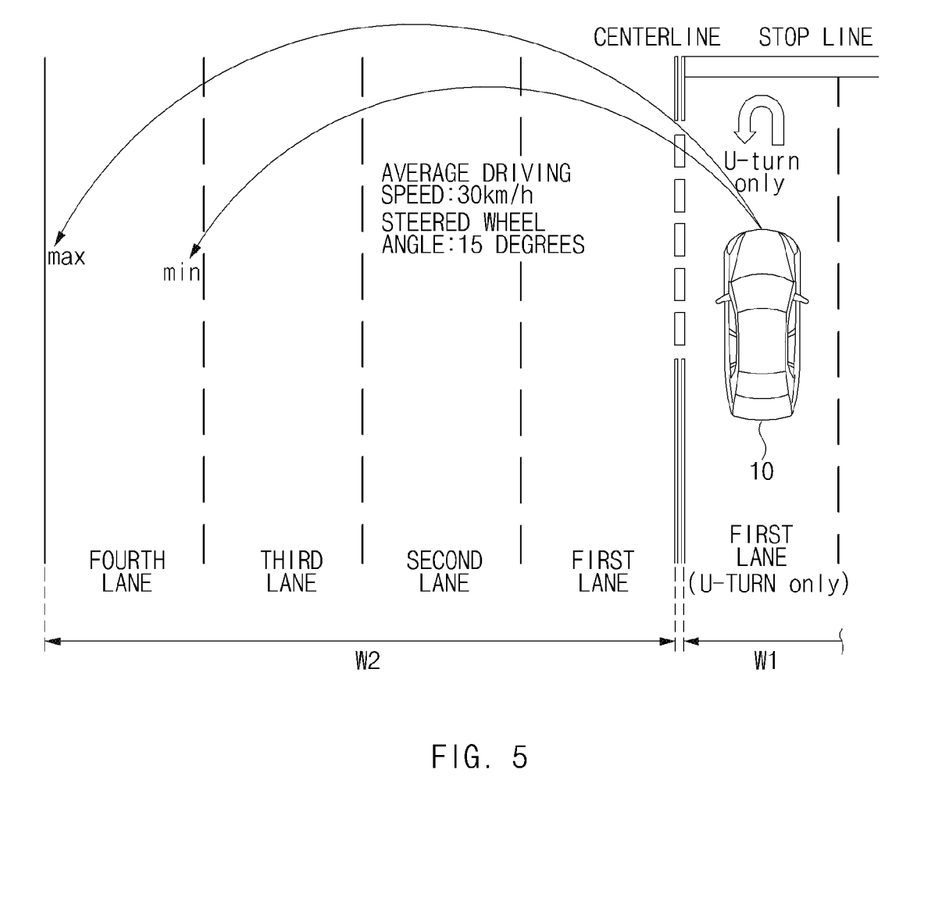

FIG. 1 is a block diagram of an autonomous driving support system according to an exemplary embodiment of the present disclosure, FIG. 2 is a diagram for illustrating a method for determining whether or not a direction may be switched at one time according to the present disclosure, and FIGS. 3 to 5 illustrate an example of determining a steered wheel angle and a vehicle speed according to the present disclosure.

As shown in FIG. 1, the autonomous driving support system may include a server 100 and a vehicle terminal 200 mounted within the vehicle. The server 100 may be configured to provide a vehicle connected to a network, that is, a connected vehicle with road information, traffic information, directions, that is, a driving route, a precise map (hereinafter, map information), multimedia (music and/or video, or the like) streaming, weather information, and/or search service, and the like in real time. Although not shown in the drawings, the server 100 may be implemented as a computing system including a communication module configured to communicate with the vehicle, a processor, and a memory.

The server 100 may include a database (DB) configured to store and manage wheel trajectory information (e.g., turning trajectory information of the vehicle) for each vehicle. The wheel trajectory information, which is obtained in advance by a vehicle manufacturer, may be a turning trajectory function or a turning trajectory range. The vehicle manufacturer may measure and structure in advance a database (DB) of a wheel trajectory, that is, a turning trajectory (e.g., turning radius) for each vehicle type, for each vehicle speed (e.g., average speed), and/or for each steered wheel angle. Then, the vehicle manufacturer may model measured data in the structured DB to derive a turning trajectory function for each vehicle. The vehicle manufacturer may also calculate a turning trajectory range for each vehicle, that is, a maximum turning radius and a minimum turning radius for each steered wheel angle and/or for each vehicle speed, from the measured data in the structured DB.

The DB may be configured to store and manage vehicle body information for each vehicle. In this connection, the vehicle body information may include a vehicle model, a vehicle size (e.g., overall width, overall length, and overall height), a wheel specification (e.g., tire specification), and the like. The DB may also be configured to store map information and/or road information (including lane width and/or the number of lanes), and the like. The vehicle terminal 200 may be mounted within the vehicle and may be configured to provide a multimedia function, a navigation function, a communication function, and the like. The vehicle terminal 200 may be implemented as an audio•video•navigation•telematics (AVNT). The vehicle terminal 200 may include a communicator 210, a positioning device 220, a detector 230, a steering controller 240, storage 250, an autonomous driving controller 260, and a processor 270.

The communicator 210 allows the vehicle terminal 200 to communicate with a device in the vehicle and/or with a device extraneous to the vehicle. The communicator 210 may use a vehicle network and/or a wireless network, or the like. A vehicle communication (e.g., Vehicle to Everything, V2X), such as a communication between a vehicle and a vehicle (e.g., Vehicle to Vehicle, V2V), a communication between a vehicle and an infrastructure (e.g., Vehicle to Infrastructure, V2I), a communication between a vehicle and a mobile device (e.g., Vehicle-to-Nomadic Devices, V2N), and/or an in-vehicle communication (e.g., In-Vehicle Network, IVN), or the like may be applied as the vehicle network. As the wireless communication technology, a wireless internet technology such as a wireless LAN (WLAN) (WiFi), a Wireless broadband (Wibro), and/or a World Interoperability for Microwave Access (Wimax), and the like, a short-range communication technology such as a Bluetooth, a Near Field Communication (NFC), a Radio Frequency Identification (RFID), and/or an Infrared Data Association (IrDA), and the like, and/or a mobile communication technology such as a Code Division Multiple Access (CDMA), a Global System for Mobile communication (GSM), a Long Term Evolution (LIE), a LIE-Advanced, and/or an International Mobile Telecommunication (IMT)-2020, and the like may be used.

Further, the positioning device 220 may be configured to measure a current position of the vehicle. In addition, the positioning device 220 may be configured to measure the vehicle position using at least one of positioning technologies such as a global positioning system (GPS), a Dead Reckoning (DR), a Differential GPS (DGPS), a Carrier Phase Differential GPS (CDGPS), and the like. The detector 230 may be configured to obtain the rotation angle of the steering wheel (e.g., steering wheel angle), the steered wheel angle, and/or the vehicle speed, or the like. The detector 230 may also be configured to obtain the rotation angle of the steering wheel and the vehicle speed via a steering wheel angle sensor (SAS) and a vehicle speed sensor. In this connection, the detector 230 may be configured to obtain the steered wheel angle that corresponds to the rotation angle of the steering wheel with reference to a mapping table pre-stored in the storage 250, which will be described below.

The steering controller 240 may be configured to adjust the steered wheel angle of the steered wheel (e.g., the front wheel) based on a rotational force applied by a driver to the steering wheel or an instruction from the processor 270, which will be described below. The steering controller 240 may specifically be configured to adjust the steered wheel angle of the steered wheel to change the vehicle's turning radius (e.g., rotating radius). The steering controller 240 may be implemented as a motor driven power steering (MDPS) system or the like.

The storage 250 may be configured to store software programmed to allow the processor 270 to perform a predetermined operation. The storage 250 may be implemented as at least one of storage media (recording media) such as a flash memory, a hard disk, an SD card (Secure Digital Card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

In particular, the storage 250 may be configured to store map information (data), the vehicle body information, and/or the road information, or the like. The vehicle body information may include the vehicle model, the vehicle size (e.g., overall width, overall length, overall height, or the like), and/or the wheel specification (e.g., a size of the wheel), and the like. The road information may include a roadway width, the lane width, and/or the number of the lanes, and the like. Further, the storage 250 may be configured to store the wheel trajectory information for the vehicle in a DB form. The wheel trajectory information may include the turning trajectory function and/or the turning trajectory range for the vehicle. In this connection, the turning trajectory range may include information regarding the maximum turning radius and information regarding the minimum turning radius for each steered wheel angle when the vehicle is stopped. Further, the storage 250 may be configured to receive and store the map information, the road information, and/or the wheel trajectory information transmitted from the server 100 via the communicator 210.

Moreover, the autonomous driving controller 260 may be configured to recognize the surrounding environment of the vehicle to plan a local path and operate the vehicle to travel along the planned local path. The autonomous driving controller 260 may be configured to acquire surrounding environment information of the vehicle via sensors such as an image sensor 261 and/or a distance sensor 262, or the like mounted on the vehicle. In addition, the autonomous driving controller 260 may be configured to adjust a driving (behavior) of the vehicle based on the surrounding environment information. In this connection, the image sensor 261 may be configured to capture a surrounding of the vehicle and acquire a surrounding image. The image sensor 261 may be implemented as at least one of a charge coupled device (CCD) image sensor, a complementary metal oxide semiconductor (CMOS) image sensor, a charge priming device (CPD) image sensor, a charge injection device (CID) image sensor, and the like. The distance sensor 262 may be configured to measure a distance between the vehicle and a surrounding object (e.g., another vehicle, obstacle, person, and the like). The distance sensor 262 may be implemented as a Radio Detecting And Ranging (radar), a Light Detection And Ranging (LiDAR), and/or an ultrasonic sensor, or the like.

The processor 270 may be configured to execute an overall operation of the vehicle terminal 200. In addition, the processor 270 may be implemented as at least one of an application specific integrated circuit (ASIC), a digital signal processor (DSP), a programmable logic device (PLD), field programmable gate arrays (FPGAs), a central processing unit (CPU), microcontrollers, and microprocessors. When a destination is set, the processor 270 may be configured to generate a driving route starting from the current position of the vehicle to the destination based on the map information (precise map). The processor 270 may be configured to provide the generated driving route to the autonomous driving controller 260. The autonomous driving controller 260 may then be configured to operate the vehicle to travel autonomously along the driving route provided from the processor 270.

Additionally, the processor 270 may be configured to determine whether the vehicle is stopped at a direction switching point on the driving route. In this connection, the direction switching point refers to a point at which a proceeding direction (heading) of the vehicle should be switched. The processor 270 may be configured to determine whether the vehicle is positioned in a lane for direction switching, that is, the direction switching point, such as a U-turn lane, a left turn lane, a right turn lane, a thru-left turn lane, or the like in association with the position information measured by the positioning device 220, the map information, the surrounding environment information, and the driving path. The processor 270 may also be configured to determine whether the vehicle is stopped based on vehicle speed and gear stage information obtained by a vehicle speed sensor (not shown) and a transmission (not shown). For example, when the vehicle speed is 0 km/h and the vehicle gear stage is in a neutral (N) or a drive (D) state, the vehicle may be determined to be stopped.

When the vehicle is stopped at the direction switching point, the processor 270 may be configured to determine the steered wheel angle in association with the driving route, the vehicle position information, the vehicle body information, and the road information. More specifically, when the vehicle is stopped at the direction switching point, the processor 270 may be configured to calculate a width of a roadway which the vehicle enters through the direction switching using the map information based on the current position of the vehicle. Alternatively, the processor 270 may be configured to receive the road information (including the roadway width information) transmitted from the server 100 via the communicator 210. In other words, the processor 270 may be provided with the roadway width information from the server 100.

The processor 270 may be configured to calculate the turning radius of the vehicle for each steering wheel angle and/or for each vehicle speed to obtain the wheel trajectory information, that is, the maximum turning radius and the minimum turning radius. Further, the processor 270 may be configured to calculate the wheel trajectory information using the turning trajectory function. The processor 270 may be configured to compare the wheel trajectory information, that is, the wheel turning radius information with the roadway width information to determine whether the vehicle may switch the direction at one time. In this connection, the processor 270 may be configured to determine whether to adjust the steered wheel angle in advance based on the wheel trajectory information of the vehicle and the roadway width information.

For example, as shown in FIG. 2, when a vehicle 10 is positioned in a U-turn only lane of a driving roadway R1, the processor 270 may be configured to obtain roadway width (RW) information, maximum turning radius (max), and minimum turning radius (min) information of the vehicle 10. The processor 270 may be configured to compare the roadway width (RW) information with the maximum turning radius (max) and minimum turning radius (min) information of the vehicle 10. When the comparison result shows that the vehicle 10 is able to enter the third lane of an opposite roadway R2 with one U-turn, the processor 270 may be configured to determine that the vehicle may switch the direction at one time.

When the vehicle 10 is able to switch the direction at one time, the processor 270 may be configured to compute an optimum turning radius (e.g., turning trajectory) for the vehicle to switch the direction at one time using the driving route, the vehicle position information, the vehicle body information, and the road information. The processor 270 may be configured to determine a target steered wheel angle and a target vehicle speed based on the optimum turning radius. The processor 270 may also be configured to transmit a steering control command based on the target steered wheel angle information to the steering controller 240. The steering controller 240 may then be configured to adjust the steered wheel angle of the steered wheel based on the steering control command transmitted from the processor 270. The processor 270 may also be configured to transmit the target vehicle speed information to the autonomous driving controller 260. The autonomous driving controller 260 may be configured to adjust the vehicle speed, that is, a rotation speed of the wheel based on the instruction from the processor 270.

In addition, the processor 270 may be configured to determine a lane of the roadway to enter through the direction switching based on the driving route. The processor 270 may be configured to determine whether the vehicle may switch the direction at one time and/or adjust the steered wheel angle in advance, based on the lane to enter. For example, when the vehicle 10 is stopped at a U-turn lane (first lane) of a first roadway W1, the processor 270 may be configured to determine a lane of a second roadway (W2, a roadway on an opposite side of the first roadway) to enter after making a U-turn based on the driving route in the stopped state. As shown in FIG. 3, when the vehicle 10 makes a U-turn and enters a second lane of the second roadway W2, and assuming that the vehicle may rotate at one time when making the U-turn with a maximized wheel angle and the vehicle speed (average driving speed) of about 15 km/h, the processor 270 may be configured to transmit a control command to the steering controller 240 to maximize the steered wheel angle and transmit a control command to the autonomous driving controller 260 to adjust the vehicle speed to about 15 km/h.

On the other hand, when the vehicle 10 makes the U-turn to enter third lane or fourth lane of the second roadway W2, and assuming that steered wheel angles and vehicle travel speeds (e.g., average driving speed) for respective entering lanes, which may allow the vehicle 10 to turn at one time, are the same as Table 1, the processor 270 may be configured to instruct the steering controller 240 to adjust the steered wheel angle to 15 degrees when the vehicle 10 enters the third lane of the second roadway W2 and instruct the autonomous driving controller 260 to adjust the vehicle speed to about 20 km/h or below on average.

TABLE 1

| Classification | Settable range | |
|---|---|---|
| | Steered wheel angle | Average driving speed |
| When entering 3 lane | ~15 degrees | ~Max 20 km/h |
| When entering 4 lane | ~10 degrees | ~Max 30 km/h |

Alternatively, when the vehicle 10 enters the fourth lane of the second roadway W2, the processor 270 may be configured to instruct the steering controller 240 and the autonomous driving controller 260 respectively to adjust the steered wheel angle and the vehicle speed to about 10 degrees and average about 30 km/h or below respectively. Further, when the steered wheel angle of the vehicle 10 is about 15 degrees and the vehicle speed is about 20 km/h, the wheel trajectory is as shown in FIG. 4, and when the steered wheel angle is about 15 degrees and the vehicle speed is about 30 km/h, the wheel trajectory is as shown in FIG. 5. In particular, when the vehicle 10 is positioned in the U-turn lane of the first roadway W1 and is about to make a U-turn and enter the fourth lane of the second roadway W2, the processor 270 may allow the steered wheel angle to be adjusted in advance at about 15 degrees and the vehicle speed to be maintained at about 30 km/h on average.

In addition, the processor 270 of the vehicle terminal 200 mounted within the vehicle may use the V2V communication to determine whether a forward driving route (e.g., a route to be driven) of another vehicle (e.g., a second vehicle) and a turning route of the vehicle (e.g., subject vehicle) (e.g., wheel trajectory) overlap with each other after determining the steered wheel angle or adjusting the steered wheel angle of the steered wheel in advance. Then, the processor 270 may be configured to change the determined steered wheel angle based on the determination result. In other words, the vehicle terminal 200 of the vehicle may be configured to receive the forward driving route of another vehicle from another vehicle via the V2V communication. Then, the vehicle terminal 200 may be configured to determine whether another vehicle is planned to enter the lane of the roadway where the vehicle is about to enter by switching the direction based on the forward driving route of another vehicle. When it is expected that another vehicle is to enter the lane of the roadway where the vehicle is about to enter by switching the direction, the vehicle terminal 200 may be configured to change the predetermined steered wheel angle to avoid collision with another vehicle. In other words, since the vehicle terminal 200 changes the steered wheel angle, the vehicle terminal 200 may also be configured to adjust the turning route.

Figure 6:
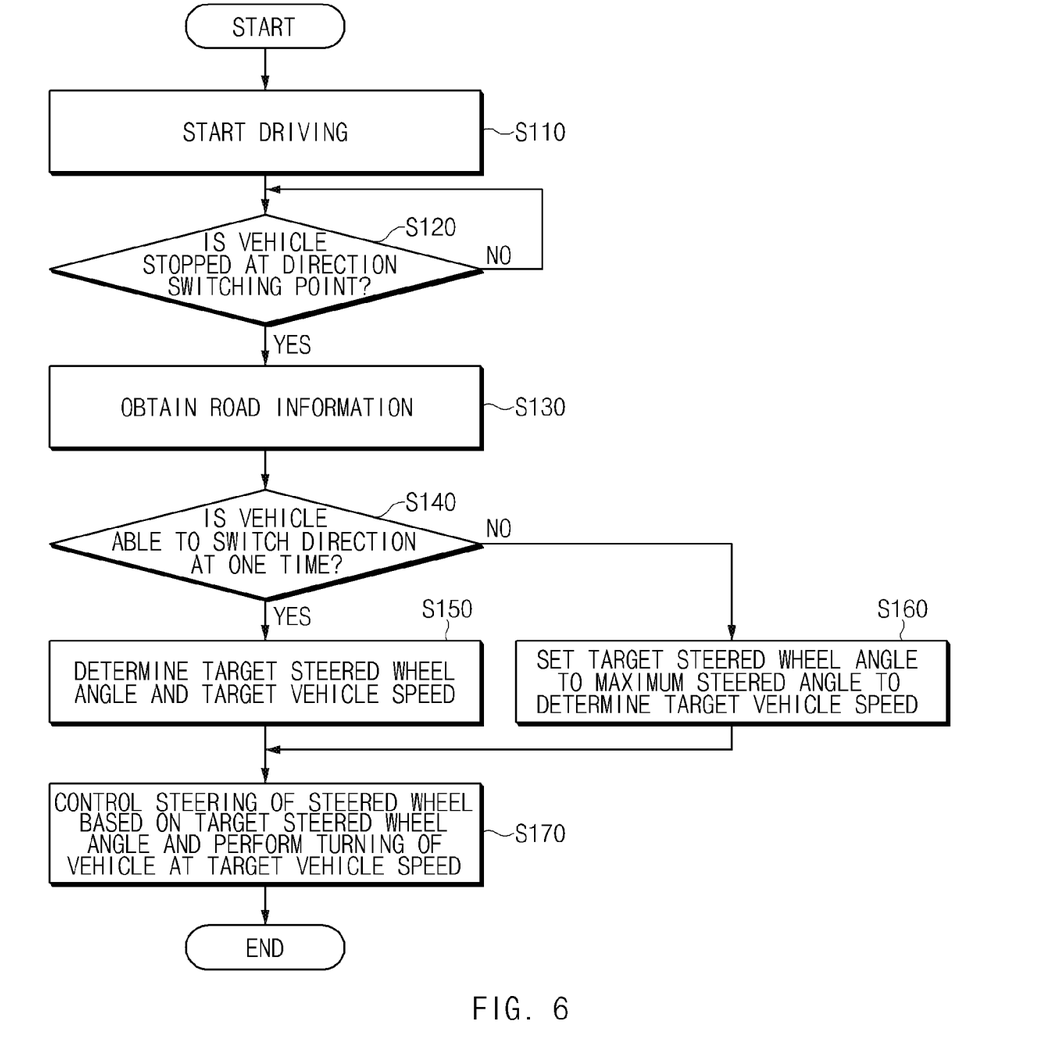
FIG. 6 is a flowchart illustrating a method for controlling steering by a vehicle terminal according to an exemplary embodiment of the present disclosure.

FIG. 6 is a flowchart illustrating a method for controlling steering by a vehicle terminal according to an exemplary embodiment of the present disclosure. Referring to FIG. 6, the vehicle terminal 200 may be configured to start the driving by planning the driving route to the destination when the destination is set (S110). The processor 270 of the vehicle terminal 200 may use the map information stored in the storage 250 to search the driving route or may request the server 100 to receive the driving route.

The processor 270 of the vehicle terminal 200 may be configured to determine whether the vehicle is stopped at the direction switching point (S120). In addition, the processor 270 may be configured to determine whether the vehicle is positioned at the direction switching point (e.g., the U-turn lane, the left turn lane, and/or the right turn lane, or the like) in association with the position information, the map information, the surrounding environment information, and the driving route. The processor 270 may also be configured to determine whether the vehicle is stopped using the vehicle speed and/or the gear stage information detected by the detector 230.

The processor 270 may be configured to obtain the road information when the vehicle is stopped at the direction switching point (S130). The road information may include information such as the roadway width, the number of the lanes, the lane width, and the like. The processor 270 may be configured to determine whether the vehicle may switch the direction at one time based on the road information (S140). In particular, the processor 270 may be configured to compare the width information of the roadway where the vehicle is about to enter (entering roadway) by the direction switching with the turning radius of the wheel for each vehicle speed to determine whether the vehicle may switch the direction at one time. In this connection, the processor 270 may be configured to calculate the entering roadway width in association with the vehicle position and map information or receive the entering roadway width information from the server 100. Further, the processor 270 may be configured to determine whether the vehicle may switch the direction at one time based on the position of the entering lane of the entering roadway.

When the vehicle is able to switch the direction at one time, the processor 270 may be configured to determine the target steered wheel angle and the target vehicle speed (S150). The processor 270 may be configured to determine the optimum steered wheel angle and vehicle speed at which the vehicle is allowed to switch the direction at one time. On the other hand, when the vehicle is not be able to perform the direction switching at one time, the processor 270 may be configured to set the target steered wheel angle to the maximum steered wheel angle and determine the vehicle speed at which the vehicle's turning radius may be minimized (S160). In other words, the processor 270 may be configured to partially perform the turning operation for switching the direction after maximally changing the steered wheel angle in advance.

Further, the processor 270 may secure the turning space via a backward movement, and then may be configured to adjust the steered wheel angle again to perform the turning operation, thereby completing the direction switching. In the present exemplary embodiment, it is described that the target steered wheel angle is set to the maximum steered wheel angle in advance when the vehicle may not be able to switch the direction at one time, but is not limited thereto. The present exemplary embodiment may provide another direction switching method by performing a route re-searching. The processor 270 may be configured to adjust the steering of the steered wheel in advance based on the determined target steered wheel angle and perform the turning of the vehicle at the target vehicle speed (S170). The processor 270 may be configured to operate the steering controller 240 based on the target steered wheel angle in the stopped state to adjust the steering of the steered wheel and operate the autonomous driving controller 260 based on the target vehicle speed to adjust the vehicle speed, thereby allowing the vehicle to turn.

Figure 7:
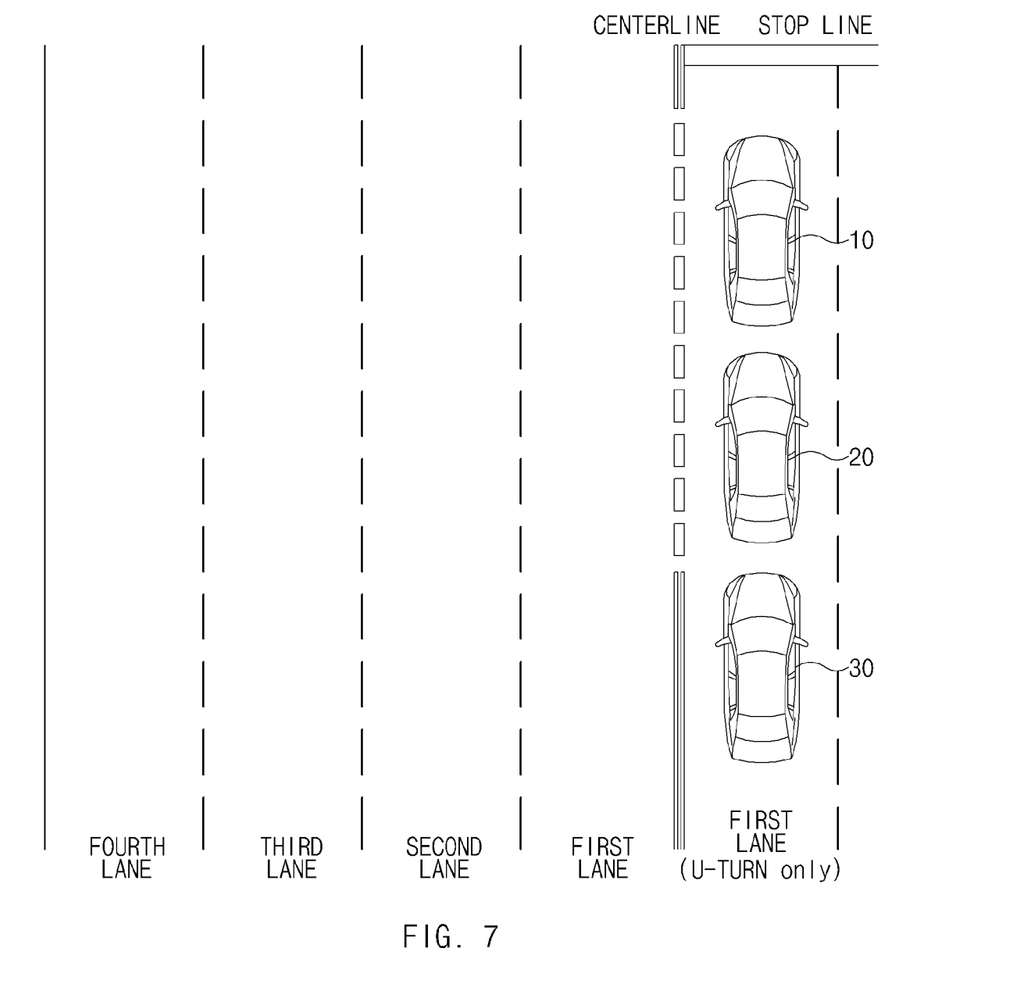
FIG. 7 is an exemplary diagram illustrating a method for controlling steering by a vehicle terminal when a preceding vehicle is present, according to an exemplary embodiment of the present disclosure.

FIG. 7 is an exemplary diagram illustrating a method for controlling steering by a vehicle terminal when a preceding vehicle is present, according to the present disclosure. As shown in FIG. 7, when a vehicle 30 is stopped in a U-turn lane and when the first preceding vehicle 10 and a second preceding vehicle 20 are present ahead of the vehicle 30, the processor 270 of the vehicle terminal 200 mounted within the vehicle 30 may be configured to determine proceeding directions of the first and second preceding vehicles 10 and 20. In this connection, when the first preceding vehicle 10 is not a connected vehicle service supporting vehicle and the second preceding vehicle 20 and the vehicle 30 are connected vehicle service supporting vehicles, the processor 270 of the vehicle terminal 200 mounted within the vehicle 30 uses the sensor(s) mounted on the vehicle 30 such as the image sensor 261 and the like to determine the proceeding direction of the first preceding vehicle 10. Further, the processor 270 may be configured to identify a proceeding direction of the second preceding vehicle 20 from the server 100. The processor 270 may be configured to identify the proceeding direction of the second preceding vehicle 20 via a direct communication with the second preceding vehicle 20 via the communicator 210.

Even when the proceeding direction of the second preceding vehicle 20 may not be known, the processor 270 of the vehicle 30 may be configured to calculate an optimum steered wheel angle for the direction switching and adjust steering of the vehicle based on the calculation result. Thereafter, the processor 270 may be configured to determine the proceeding direction via a movement of the second preceding vehicle 20 and adjust turning of the vehicle based on the determination result. For example, when the second preceding vehicle 20 makes a left turn, the processor 270 once may be configured to execute a U-turn of the vehicle. Further, when the second preceding vehicle 20 makes a U-turn, the processor 270 may be configured to remain in standby for a predetermined period of time and then execute a U-turn when the second preceding vehicle 20 is away from the vehicle 30 by a particular distance.

Figure 8:
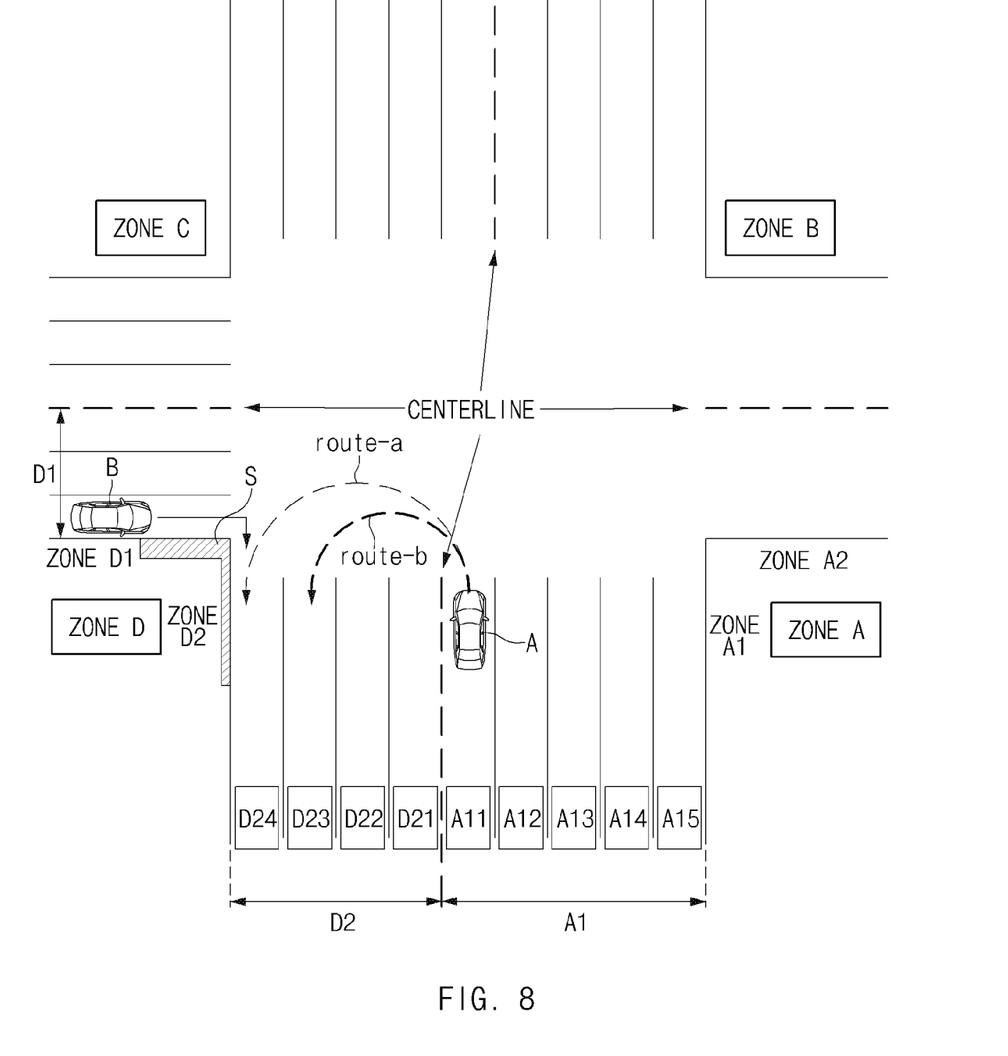
FIG. 8 is an exemplary diagram illustrating a method for controlling steering based on a surrounding environment by a vehicle terminal, according to an exemplary embodiment of the present disclosure.

FIG. 8 is an exemplary diagram illustrating a method for controlling steering based on a surrounding environment by a vehicle terminal, according to the present disclosure. When a vehicle A stops at an A11 lane (U-turn lane) of a A1 roadway and is about to enter a D24 lane of a D2 roadway, the vehicle terminal 200 of the vehicle A may be configured to determine whether a vehicle entering (or about to enter) each lane of the D2 roadway exists, an entry situation (a speed, a route, a relative distance, or the like of the entering vehicle), or the like. In this connection, the vehicle terminal 200 of the vehicle entering the D2 roadway may use a vehicle-to-vehicle route information sharing service to transmit wirelessly (e.g., WiFi, Bluetooth, V2V, or the like), to another vehicle, that the vehicle is planned to enter a specific lane of the D2 roadway.

Alternatively, a traffic information infrastructure network is constructed to allow the vehicle terminal 200 to collect information (e.g., a lane to be entered, a speed, the number of entering vehicles, traveling route, or the like) of vehicles traveling from a D1 roadway to the D2 roadway, and then, to transmit the collected information to vehicles in an area around an intersection. Alternatively, the vehicle A uses an external camera (external sensor) mounted thereon to set a turning route (route-a) for a U-turn at a current position and may be configured to determine whether another vehicle entering from an opposite roadway to a route overlapping with the turning route (route-a) exists. Alternatively, a sensor (e.g., LED line/monitoring sensor, etc.) may be attached to a side of a sidewalk block of a specific section S of a zone D. Further, a notification device installed on the sidewalk block of the zone D may be configured to collect information regarding inter-zone traveling vehicles and then transmit the collected information to the vehicles around the intersection. Therefore, the vehicle A may be configured to determine whether another vehicle entering from another zone is present on the turning route.

For example, when a vehicle B positioned in a third lane of the D1 roadway is planned to turn right and enter the D24 lane of the D2 roadway while the vehicle A is stopped at an A11 lane (U-turn lane) of an A1 roadway and plans the turning route (route-a) and while the wheel is rotated in advance by a particular angle (e.g., about 5 degrees to left), the vehicle A makes a U-turn and may be configured to change the turning route (route-a) through which the vehicle A enters the D24 lane of the D2 roadway into a turning route (route-b) through which the vehicle A enters the D23 lane of the D2 mad, and adjust an angle of rotation of the vehicle wheel.

Figure 9:
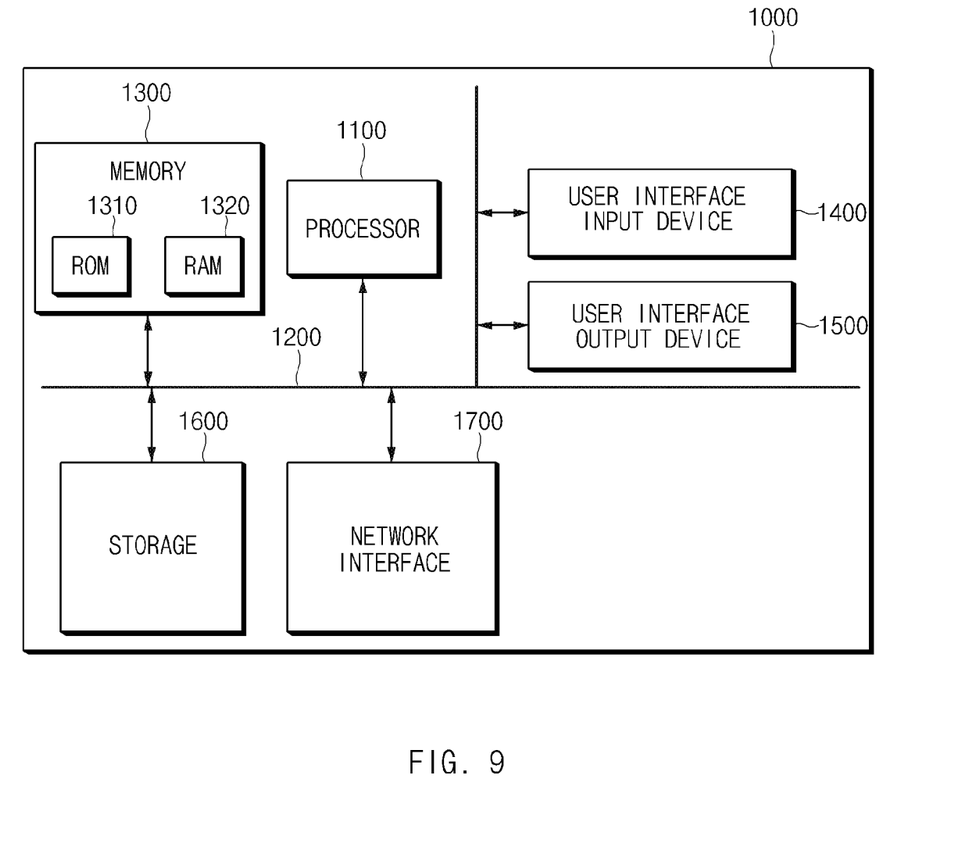
FIG. 9 illustrates a computing system that implements a method for controlling steering according to an exemplary embodiment of the present disclosure.

FIG. 9 illustrates a computing system that implements a method for controlling steering according to an exemplary embodiment of the present disclosure. With reference to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

According to the present disclosure, the steered wheel angle of the wheel is adjusted in advance in consideration of the surrounding environment of the vehicle while the vehicle is stopped for the direction switching. Therefore, increasing of the turning radius of the vehicle may be prevented and a traffic jam due to reducing of the traveling speed of the turning vehicle may be minimized. Further, according to the present disclosure, the surrounding environment such as another vehicle approaching the lane where the vehicle switches the direction and is about to enter, the obstacle, and/or small lane width, or the like is collected. Then, the optimum turning radius is calculated based on the collected information. Then, the steered wheel angle is set in advance based on the calculated turning radius to increase the traveling speed of the turning vehicle and to prevent a situation in which the vehicle is not able to turn. Therefore, traffic flow may become smooth.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle terminal, comprising:
a steering controller configured to adjust a steering; and
a processor configured to:
determine a steered wheel angle when a vehicle is stopped at a direction switching point, based on road information based on a current position of the vehicle;
instruct the steering controller to adjust the steering wheel in advance based on the determined steered wheel angle; and
change the steered wheel angle using a Vehicle to Vehicle communication when a forward driving route of another vehicle overlaps with a turning route of the vehicle.

2. The vehicle terminal of claim 1, wherein the road information includes at least one of the group consisting of: a roadway width, a lane width, and the number of lanes.

3. The vehicle terminal of claim 2, further comprising storage storing wheel trajectory information, wherein the processor is configured to determine whether the vehicle is able to switch direction at one time based on the wheel trajectory information and the roadway width.

4. The vehicle terminal of claim 3, wherein the wheel trajectory information includes at least one of a turning trajectory function for the vehicle and a turning trajectory range for the vehicle.

5. The vehicle terminal of claim 4, wherein the turning trajectory range for the vehicle includes maximum turning radius and minimum turning radius for each steering wheel angle and for each vehicle speed.

6. The vehicle terminal of claim 3, wherein the processor is configured to calculate an optimum steered wheel angle for performing the direction switching at one time based on the roadway width when the vehicle is able to switch the direction at one time.

7. The vehicle terminal of claim 6, wherein the processor is configured to calculate the optimum steered wheel angle based on a predetermined driving route.

8. The vehicle terminal of claim 6, wherein the processor is configured to collect surrounding environment information using sensors mounted on the vehicle and calculate the optimum steered wheel angle based on the collected surrounding environment information.

9. The vehicle terminal of claim 8, wherein the surrounding environment information includes at least one of a surrounding image of the vehicle and a distance between the vehicle and a surrounding object.

10. The vehicle terminal of claim 6, wherein the processor is configured to calculate a vehicle speed when calculating the optimum steered wheel angle.

11. The vehicle terminal of claim 3, wherein the processor is configured to determine the steered wheel angle to be a maximum steered wheel angle when the vehicle is not able to switch the direction at one time.

12. A method for controlling steering by a vehicle terminal, the method comprising:
determining, by a processor, whether a vehicle is stopped at a direction switching point;
determining, by the processor, a steered wheel angle when the vehicle is stopped at the direction switching point, based on road information based on a current position of the vehicle;
adjusting, by the processor, a steering wheel in advance based on the determined steered wheel angle; and
changing, by the processor, the steered wheel angle using Vehicle to Vehicle communication when a forward driving route of another vehicle overlaps with a turning route of the vehicle after the determining of the steered wheel angle.

13. The method of claim 12, wherein the road information includes at least one of the group consisting of: a roadway width, a lane width, and the number of lanes.

14. The method of claim 13, further comprising:
determining, by the processor, whether the vehicle is able to switch direction at one time based on wheel trajectory information and the road information after determining whether the vehicle is stopped at the direction switching point.

15. The method of claim 14, wherein the wheel trajectory information includes at least one of a turning trajectory function for the vehicle and a turning trajectory range for the vehicle.

16. The method of claim 15, wherein the turning trajectory range for the vehicle includes maximum turning radius and minimum turning radius for each steering wheel angle and for each vehicle speed.

17. The method of claim 14, wherein the determining of the steered wheel angle includes:
calculating, by the processor, an optimum steered wheel angle for performing the direction switching at one time based on the roadway width when the vehicle is able to switch the direction at one time.

18. The method of claim 17, wherein the determining of the steered wheel angle includes:
   calculating, by the processor, the optimum steered wheel angle based on a predetermined driving route.

19. The method of claim 17, wherein the determining of the steered wheel angle includes:
   collecting, by the processor, surrounding environment information using sensors mounted on the vehicle; and
   calculating, by the processor, the optimum steered wheel angle based on the collected surrounding environment information.

20. The method of claim 19, wherein the surrounding environment information includes at least one of a surrounding image of the vehicle and a distance between the vehicle and a surrounding object.

21. The method of claim 17, wherein the determining of the steered wheel angle includes:
   calculating, by the processor, a vehicle speed when calculating the optimum steered wheel angle.

22. The method of claim 17, wherein the determining of the steered wheel angle includes:
   determining, by the processor, the steered wheel angle to be a maximum steered wheel angle when the vehicle is not able to switch the direction at one time.

* * * * *